United States Patent [19]

Hill et al.

[11] 4,105,891
[45] Aug. 8, 1978

[54] METAL-INERT-GAS WELDING TORCH

[75] Inventors: Clifford W. Hill; Donald W. Carkhuff; Frank J. Pilia, all of Florence, S.C.

[73] Assignee: Union Carbide Corporation, New York, N.Y.

[21] Appl. No.: 729,350

[22] Filed: Oct. 4, 1976

Related U.S. Application Data

[63] Continuation of Ser. No. 540,456, Jan. 13, 1975, abandoned.

[51] Int. Cl.² .............................................. B23K 9/16
[52] U.S. Cl. .................. 219/137.43; 219/74
[58] Field of Search .................. 219/74, 130, 136

[56] References Cited

U.S. PATENT DOCUMENTS

| 3,544,758 | 12/1970 | Dal Molin | 219/74 X |
| 3,659,076 | 4/1972 | Ogden, Sr. | 219/130 |
| 3,803,381 | 4/1974 | Bernard et al. | 219/74 X |

Primary Examiner—J. V. Truhe
Assistant Examiner—N.D. Herkamp
Attorney, Agent, or Firm—John R. Doherty

[57] ABSTRACT

A metal inert gas welding torch having a wire guide assembly threadably secured at one end to a torch body and a collet nut assembly threadably secured to the other end of the wire guide assembly. A spidered collet is mounted in the collet nut assembly and forms a plenum chamber with the wire guide assembly and collet nut. A contact tip is gripped by the spidered collet and extends into the plenum chamber whereby the shielding gas cools the contact tip prior to the distribution of such gas into a nozzle.

7 Claims, 3 Drawing Figures

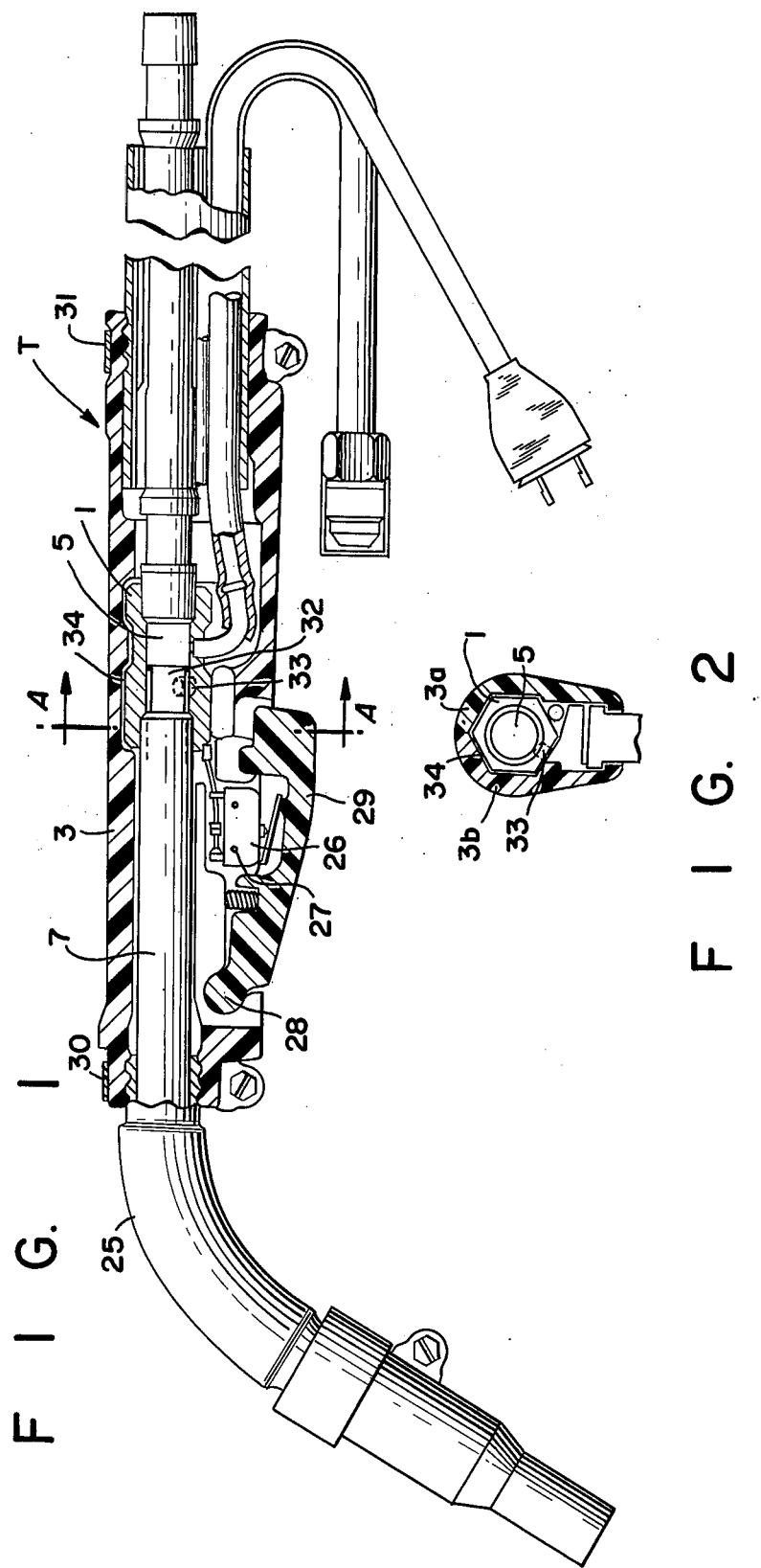

METAL-INERT-GAS WELDING TORCH

This application is a continuation of our prior U.S. application Ser. No. 540,456, filing date Jan. 13, 1975, now abandoned.

The invention relates to an electric arc welding torch. More particularly this invention relates to a consumable electrode metal arc gas shielded welding torch.

In metal inert gas welding (Mig) a consumable electrode wire is fed from a source thereof through a welding torch to a point of use. Welding current is usually introduced into the wire through a tubular contact tip mounted in the torch. The industry is constantly seeking welding torches of this type which are simple, inexpensive to manufacture, have longer contact tip life and generally are easy to handle. The torch of this invention has these and several other desirable features as will be described hereinafter.

In one aspect of this invention a torch is provided with a system for using the shielding gas passing through the torch to cool the contact tip. The relatively low contact tip operating temperature will minimize the tendency for weld spatter to clog the contact tip which of course requires replacement of the tip. The torch provides for easy replacement of the contact tip when it does become necessary to change the tip from excess spatter or from burnback of the wire into the tip.

The torch also has an arrangement for providing better distribution of the shielding gas passing through the torch thus providing better gas shielding of the arc and weld puddle.

Accordingly, it is an object of this invention to provide a torch which is simple and inexpensive to manufacture, has relatively low contact tip and torch handle temperatures, has a low-cost torch body, has an easily replaced wire guide assembly, has a relatively low-cost collet nut assembly and has a curved wire guide assembly with an effective locking means to prevent rotation and loosening during usage.

These and other features of the invention will either be pointed out or become apparent from the following description and drawings wherein FIG. 1 is a front elevation view partially in cross-section of the torch of the invention;

FIG. 2 is a cross-sectional view taken along the line A—A in FIG. 1; and

Figure 3:
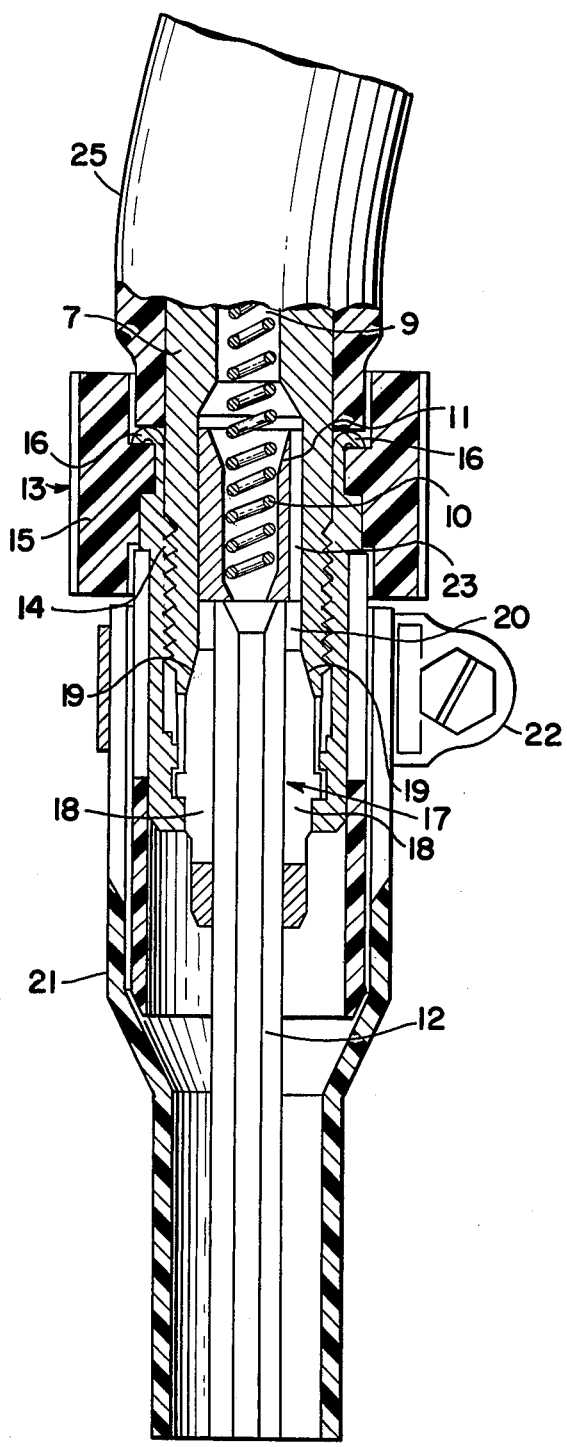
FIG. 3 is an enlarged cross-sectional view of the front end of the torch shown in FIG. 1.

The objects of the invention are accomplished in one mode by a torch having a split torch handle. A torch body with a gas passage therein is fitted into molded slots in the halves of the split torch handle. A wire guide assembly is removably fastened at one end thereof to the torch body and has a gas passage therein communicating with the gas passage in the torch body. A spidered collet is fitted into a collet nut assembly, which includes a collet nut and an insulating nut secured together. The collet nut is threadably fastened to the other end of the wire guide assembly. The spidered collet, collet nut assembly and wire guide assembly form a plenum chamber for receiving gas from the gas passage in the wire guide assembly. A tubular contact tip is fitted into and gripped by the spidered collet and preferably extends into the plenum chamber so that the shielding gas passing through the torch will pass in direct contact along at least a portion of the contact tip. The spidered collet can be tightened around the contact tip by threading the collet nut on the wire guide assembly. An insulated nozzle is secured to the collet nut assembly and receives gas from the spidered collet after it passes along the contact tip.

Having described the invention in general terms reference will now be made to the drawings which illustrate a preferred embodiment of the invention. Referring to FIG. 1 the torch "T" has a torch body 1 fitted into slots molded into the torch handle 3 which is split into two halves 3a and 3b (see FIG. 2). The torch body 1 has a gas and wire passage 5 therein for receiving gas and wire from a source of each through a common conduit. Threadably fastened to the torch body 1 is a curved wire guide assembly 7. Preferably a pipe thread is used to connect assembly 7 to torch body 1 as will be described in more detail hereinafter. The wire guide assembly 7 has a gas and wire passage 9 communicating with gas and wire passage 5 in the torch body. See FIG. 3. The gas and wire passage 9 terminates at a centering bushing 11, located in the wire guide assembly 7. Centering bushing 11 which is closely fitted to a continuous wire liner 10 located in gas and wire passage 9 which extends all the way back through the gas wire passages 9 and 5 to the wire feeder. The centering bushing is preferably made from pinion stock. Threadably secured to the end of the wire guide assembly 7 is a collet nut assembly 13. Collet nut assembly 13 includes a collet nut 14 and an insulating nut 15. The collet nut is secured to the insulating nut by crimping at point 16. A collet 17 is mounted in collet nut 14. Collet 17 has a plurality of sections 18 forming a spidered portion. The sections 18 terminate in tapered portions which mate with tapered portions of the wire guide 7 at point 19. The arrangement permits the spidered collet 17 to be tightened about contact tip 12 by threading insulating nut 15 of a collet nut assembly 13 on wire guide assembly 7. The wire guide assembly 7 and centering bushing 11 therein forms a plenum chamber 20 with the spidered collet 17. An insulated nozzle assembly 21 is secured to the collet nut 14 by a hose type clamp 22.

As mentioned above the spidered collet 17 is actuated by the collet nut 14 and insulation nut 15 (collet nut assembly 13). Because of the way the collet 17 is mounted in the collet nut 14, the collet 17 is free to turn in the collet nut and against the tapered ends of the wire guide assembly 7. This permits the collet 17 to seat against the wire guide assembly 7 in the most favorable position and with a minimum twisting of the section 18 of the collet. This feature accommodates slight eccentricity and misalignment of mating parts. The results are improved gripping of contact tip 12 and increased heat transfer from contact tip 12 to the collet 17 to the wire guide assembly 7.

Feeding wire through the torch is improved by the continuous spiral liner 10 that extends from the wire feeder to the centering bushing 11. The close fit between the outside diameter of the liner about 0.186 inches and the inside diameter about 0.190 inches of the center bushing provides excellent centering and alignment of the wire as it enters the contact tip 12. This combination also permits reliable self threading of the wire through the torch.

The close fit between the centering bushing 11 and the liner 10 necessitates additional area for gas flow. This is accomplished by the passages 23 between the external flutes of the pinion stock that is used for the centering bushing and the inside diameter of the curved wire guide assembly 7. The gas then flows into the chamber 20 between the collet and the centering bushing. This chamber equalizes gas pressures and thereby improves gas shielding.

An objective of the split handle design is to provide easy assembly and disassembly and repair of internal parts. Assembly is very easily accomplished. For example, one-half of the split handle is placed on a flat surface. The assembled curved wire guide assembly 7, with the wire guide insulator 25, therearound, the torch body 1 and the service lines are placed into cavities 34 molded into the handle which fit these parts. A quick disconnect switch 26 is placed over the two pins 27 that are molded into the handle. The cylindrical pivot portion 28 of the torch switch lever 29 fits into a mating cavity in half of the torch handle. The other half of the handle is then positioned and the two handle halves are held together by means of the hose clamps 30 and 31, one at each end of the handle.

The torch body 1 is made from hex stock. The hex shape provides important wrench flats for use during assembly and disassembly. The projection 32 of wire guide assembly 7 in combination with set screw 33 in the torch body 1 and the substantial lock force provided by using pipe threads between the body 1 and assembly 7 provide an effective joint that does not loosen or have a high voltage drop. The pipe thread is similarly effective for the torch body to service line connection.

Having described the invention with reference to a preferred embodiment, it should be understood that modification may be made to certain parts and to the arrangement of such parts without departing from the spirit and scope of the invention.

What is claimed is:

1. In a gas shielded consumable electrode arc welding torch including a torch handle, a torch body having a gas passage therein fitting into said handle, a wire guide assembly fastened at one end thereof to said torch body and having a gas passage communicating with the gas passage in said torch body, a tubular contact tip removably attached to the forward end of said wire guide assembly and an insulated nozzle assembly mounted around said contact tip, the improvement of which comprises:

a collet member fitted over said contact tip and having a plurality of resilient spidered sections at one end thereof terminating in tapered portions which seat with mating tapered portions on the forward end of said wire guide assembly whereby said collet member and said contact tip are maintained in alignment with said wire guide assembly, said resilient spidered sections defining a plurality of gas passages adjacent to said contact tip;

a collet nut rotatably fastened to the forward end of said wire guide assembly and engaging said collet member in a manner whereby to permit said collet member to rotate within the forward end of said wire guide assembly when said collet nut is rotatably fastened thereto;

means affixed to said collet nut for rotating said collet nut when fastened onto the forward end of said wire guide assembly and for tightening the engagement between the mating tapered portions of said collet member and wire guide assembly whereby said resilient spidered sections are caused to tightly grasp said contact tip;

means forming a plenum chamber communicating with the gas passage in said wire guide assembly and said plurality of gas passages defined by said resilient spidered sections whereby gas is allowed to pass at least along a portion of said contact tip; and means for independently securing said insulating nozzle assembly onto said collet nut.

2. Torch according to claim 1 wherein said means for rotating said collet nut comprises an insulating nut affixed to said collet nut.

3. Torch according to claim 1 wherein said means forming a plenum chamber comprises a centering bushing located in said wire guide assembly, said plenum chamber being defined by the walls of said wire guide assembly and said collet member.

4. Torch according to claim 3 wherein said centering bushing is made from pinion stock.

5. Torch according to claim 3 wherein a continuous wire liner is located in the gas passage of said wire guide assembly and in said centering bushing.

6. Torch according to claim 1 wherein said handle is split.

7. Torch according to claim 1 wherein said wire guide assembly is fastened to said torch body by pipe threads.

* * * * *